W. H. Hawley,
Grapple
Nº 82,832.  Patented Oct. 6, 1868.
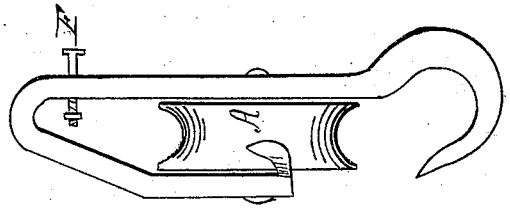
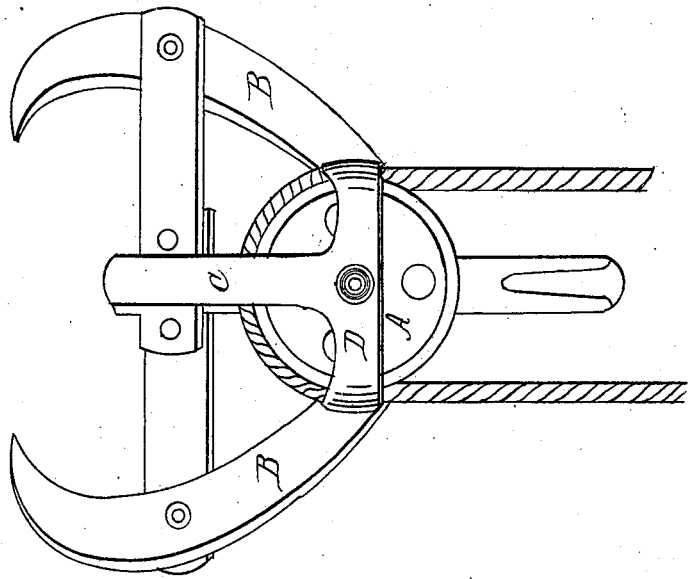
Witnesses:
Dolphas W Bennett
William R. Anthony
Inventor:
Wm H Hawley

United States Patent Office.

WILLIAM H. HAWLEY, OF UTICA, NEW YORK.

Letters Patent No. 82,832, dated October 6, 1868.

IMPROVEMENT IN GRAPPLING-IRONS.

The Schedule referred to in these Letters Patent and making part of the same.

TO ALL WHOM IT MAY CONCERN:

Be it known that I, WILLIAM H. HAWLEY, of Utica, Oneida county, New York, have invented a new and useful Improvement on my Improved Grappling-Irons, No. 69,992, for which Letters Patent were granted, October 22, 1867.

The nature of my improvement consists in attaching the pulley-wheel A to the grapple with a bolt or rivet, passing through a bar or hook, as shown in fig. 1, the letter C showing the bar or hook; D, the rivet or bolt; A, the pulley-wheel, over which we pass the draught or hoisting-rope E, as in any ordinary pulley, for the purpose of hoisting or hauling, as will be seen in the drawing, fig. 1, and thereby serving the double purpose of pulley and grapple; and I do hereby declare that the following is a full, clear, and exact description of the said invention, and of the mode of operating the same, reference being had to the annexed drawings, in which—

Figure 1 represents a perspective view of the invention.

Figure 2 is a side view, showing the attachment of the pulley to the grapple by a bar or hook, the letter A showing pulley-wheel; C, the bar or hook; D, the rivet or bolt; F, the bolt which attaches the bar or hook to the toggle-joint B, as seen in fig. 1.

This arrangement is very simple, strong, and cheap, serving the purpose of both pulley and grapple in its working.

What I claim as my invention, and desire to secure by Letters Patent, is—

The combination of the pulley A with the grapple, constructed and operating substantially as described, and for the uses and purposes mentioned.

WILLIAM H. HAWLEY.

Witnesses:
DOLPHAS BENNETT,
WILLIAM R. ANTHONY.